US007340626B2

(12) United States Patent
Maitani

(10) Patent No.: US 7,340,626 B2
(45) Date of Patent: Mar. 4, 2008

(54) IMAGE FORMING APPARATUS

(75) Inventor: Yoshifumi Maitani, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 390 days.

(21) Appl. No.: 11/087,265

(22) Filed: Mar. 23, 2005

(65) Prior Publication Data

US 2005/0211692 A1 Sep. 29, 2005

(30) Foreign Application Priority Data

Mar. 25, 2004 (JP) ............................ 2004-090309

(51) Int. Cl.
*G06F 1/32* (2006.01)

(52) U.S. Cl. ...................... 713/323; 713/300; 713/320; 713/324; 323/234; 323/241; 323/300; 323/320; 219/497

(58) Field of Classification Search ................ 713/323
See application file for complete search history.

(56) References Cited

U.S. PATENT DOCUMENTS

| | | | | |
|---|---|---|---|---|
| 4,593,323 | A * | 6/1986 | Kanda et al. | 379/100.01 |
| 5,483,464 | A * | 1/1996 | Song | 713/300 |
| 6,769,070 | B1 * | 7/2004 | Kawata | 713/324 |
| 7,149,902 | B2 * | 12/2006 | Ryu | 713/300 |
| 2003/0202296 | A1 * | 10/2003 | Hamano et al. | 361/2 |

FOREIGN PATENT DOCUMENTS

| | | |
|---|---|---|
| JP | 62-160522 | 7/1987 |
| JP | 07-186492 | 7/1995 |
| JP | 2000-284892 | 10/2000 |

* cited by examiner

*Primary Examiner*—Nitin C. Patel
(74) *Attorney, Agent, or Firm*—Renner, Otto, Boisselle & Sklar, LLP

(57) ABSTRACT

An image forming apparatus includes a main power supply section, an auxiliary power supply section, a plurality of sensors, and a power control section. The sensors are disposed at a plurality of positions. The sensors change output levels thereof upon detection of a user's operation for initiating an image forming process. The power control section switches the apparatus from a normal operation mode to the power-saving operation mode after a predetermined time period during which no image forming process is performed. The power control section detects the respective output levels of the sensors through sequential power supply from the auxiliary power supply section to the sensors. The power control section switches the apparatus to the normal operation mode upon detection of a change in output level of either one of the sensors.

5 Claims, 6 Drawing Sheets

IMAGE FORMING APPARATUS

CROSS REFERENCE

This Nonprovisional application claims priority under 35 U.S.C. § 119(a) on Patent Application No. 2004-090309 filed in Japan on Mar. 25, 2004, the entire contents of which are hereby incorporated by reference.

BACKGROUND OF THE INVENTION

The invention relates to an image forming apparatus performing an image forming process in accordance with input image data. The invention relates in particular to an image forming apparatus which stands by for input of image data with reduced power consumption.

A growing demand for electric power saving has contributed to an increasing number of image forming apparatus with a power-saving operation mode. The power-saving operation mode is an operation mode in which an image forming apparatus stands by for input of image data with reduced power consumption. Conventionally, an image forming apparatus in the power-saving operation mode returns to a normal operation mode upon operation of a specific key such as a print start key.

Such image forming appartus, however, does not return to the normal operation mode upon operation of a key other than the specific key. Thus, a user unfamiliar with key operation on an image forming apparatus sometimes has difficulty in returning the image forming apparatus from the power-saving operation mode to the normal operation mode.

In view of the foregoing, JP S62-160522A discloses a configuration in which operation of any key at X, Y coordinates in a key matrix allows return from the power-saving operation mode to the normal operation mode. Application of the configuration may appear to facilitate return of an image forming apparatus as in the power-saving operation mode to the normal operation mode.

The invention according to JP S62-160522A, however, does not allow the return upon an operation other than the key operation. Accordingly, the image forming apparatus returns from the power-saving operation mode to the normal operation mode only when a user, who is just about performing an image forming process, actually performs a key operation to the apparatus.

A feature of the present invention is to offer an image forming apparatus capable of returning from the power-saving operation mode to the normal operation mode upon detection of not only a key-operation but also an operation other than the key operation with reduced power consumption in the power-saving operation mode.

SUMMARY OF THE INVENTION

An image forming apparatus according to the invention includes a plurality of sensors for detecting a user's preparatory operation for an image forming process, and a power supply control section for switching operation modes of the apparatus.

The preparatory operation includes operations such as: for opening or closing an original document cover; for placing an original document on a platen; for placing a recording sheet on a manual feed tray; or for refilling a paper cassette. In the normal operation mode, respective output levels of the sensors are used for confirming a state of the image forming apparatus. In the power-saving operation mode, the respective output levels are used for determining at which timing the apparatus is to be switched to the normal operation mode. Accordingly, the sensors are in a constant activated state in the normal operation mode, while the sensors are intermittently activated in the power-saving operation mode. Also, in the power-saving operation mode, the auxiliary power supply section supplies power to the sensors in order to reduce power consumption.

The power supply control section switches the apparatus from the power-saving operation mode to the normal operation mode upon detection of a change in output level of either one of the sensors caused by the user's preparatory operation. The switching of the operation modes is performed because it is highly likely that the preparatory operation is followed by an actual image forming process.

DETAILED DESCRIPTION OF THE INVENTION

Figure 1:
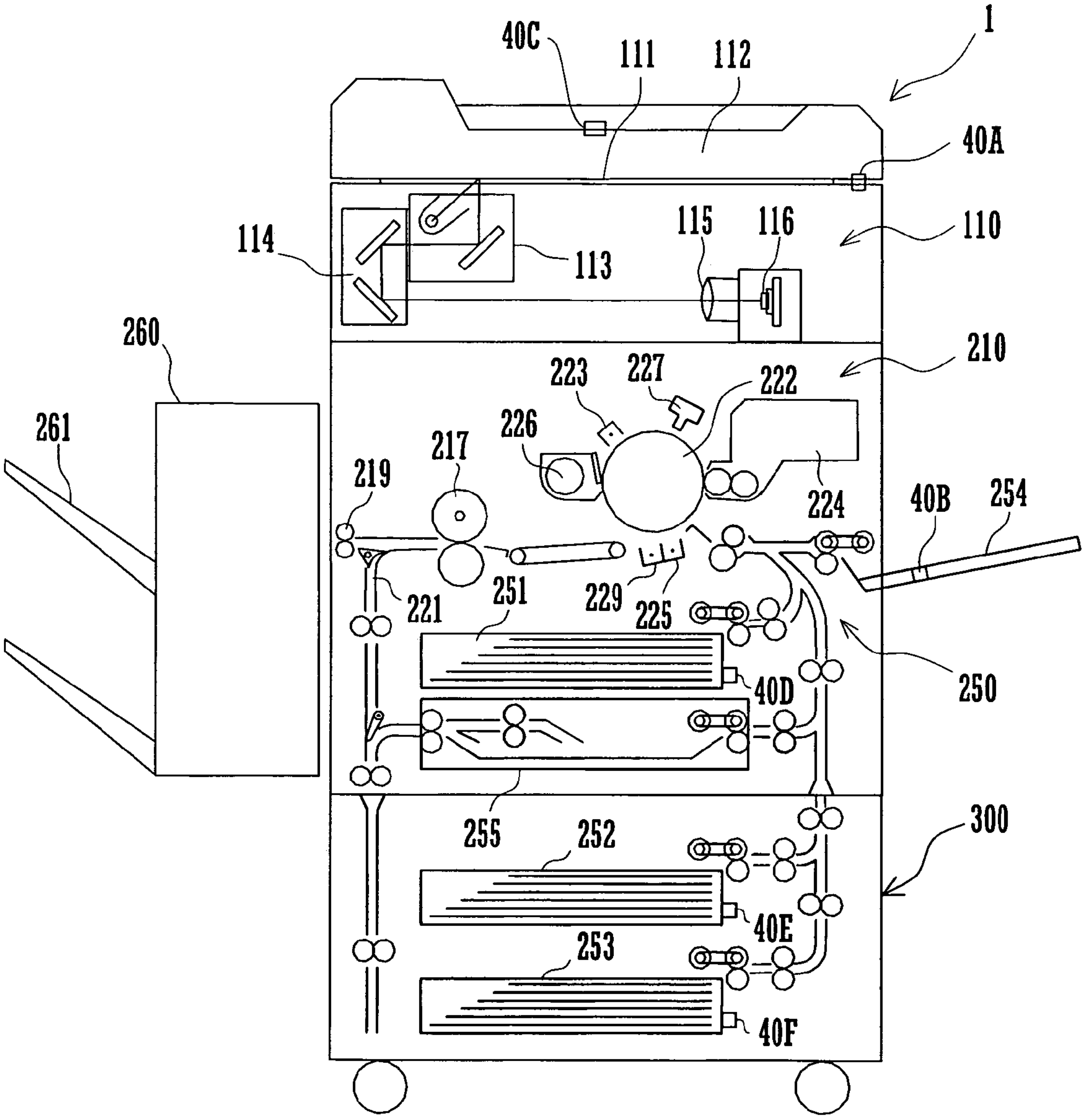
FIG. 1 is a front sectional view schematically illustrating a construction of an image forming apparatus according to the invention.

FIG. 1 schematically illustrates the construction of a digital image forming apparatus 1. As shown in the figure, the digital image forming apparatus 1 includes an image reading section 110, an image forming section 210, a sheet feeding section 300, and a post-processing unit 260.

The image reading section 110 includes a platen 111 made of transparent glass, an automatic document feeder 112 disposed above the image reading section 110, and an optical system unit for reading an image on an original document placed on the platen 111.

The automatic document feeder 112 operates to feed a plurality of documents set on a document set tray to the platen 111 sheet by sheet. The optical system unit, which is disposed below the platen 111, operates to scan the document placed on the platen 111 to read the image thereof. The optical system unit includes a first scanning unit 113, a second scanning unit 114, an optical lens 115, and a CCD line sensor 116. The sensor 116 is a photoelectric converter.

The first scanning unit 113 includes an exposure lamp unit for exposing the document surface to light, and a first mirror for reflecting a reflected light image from the document toward a predetermined direction. The second scanning unit 114 includes a second mirror and a third mirror for guiding the reflected light from the document having been reflected by the first mirror to the CCD line sensor 116. The optical lens 115 causes the reflected light from the document to form an image on the CCD line sensor 116.

In cooperation with the operation of the automatic document feeder 112, the image reading section 110 reads the image on an original document automatically fed by the automatic document feeder 112 at a predetermined image reading position. The image on the document read by the image reading section 110 is transmitted to a not-shown image data inputting section as image data, and the image data thus inputted is subjected to predetermined image processing and then temporarily stored in a memory of an image processing unit.

The image data stored in the memory is read out in accordance with an instruction to output and transmitted to an optical writing device 227 included in the image forming section 210. The optical writing device 227 has an LED writing head of a solid-state scanning system and the like, as will be described later.

Disposed below the image forming section 210 are, a manual feed tray 254, a paper cassette 251 and a duplex unit 255. Further below the image forming section 210 is disposed the sheet feeding section 300 including paper cassettes 252 and 253.

A sheet feeding path is defined to extend from each of the paper cassettes 251 to 253 and from the manual feed tray 254, through an image forming position to be described later, to the post-processing unit 260. A recording sheet fed from each of the paper cassettes 251 to 253, from the manual feed tray 254 or from the duplex unit 255 is conveyed to the image forming section 210 by means of a conveyor unit 250 including a conveyor roller.

The duplex unit 255, which is connected to a switch back path 221 adapted to reverse recording sheets, is used in forming images on both sides of a recording sheet. It is to be noted that the duplex unit 255 is so structured that it can be exchanged with a normal paper cassette. Thus, the duplex unit 255 can be replaced with a normal paper cassette.

The image forming section 210 includes an image forming unit, a fixing unit 217 and sheet ejecting rollers 219, which are arranged along the sheet feeding path from the upstream side toward the downstream side in the mentioned order. The image forming unit includes a photosensitive drum 222 as an image carrier, the optical writing device 227 as an exposing device, an electrostatic charger 223 for charging the photosensitive drum to a predetermined potential, a developing unit 224 for developing an electrostatic latent image formed on the photosensitive drum 222 into a tangible image by supplying toner to the electrostatic latent image, an image transfer device 225 of the charger type for transferring the toner image formed on a surface of the photosensitive drum 222 onto a recording sheet, a static eliminator 229 for eliminating static charge from the recording sheet to allow the recording sheet to be easily released from the image carrier 222, and a cleaner 226 for recovering excess toner.

A charging process, an exposure process, a developing process, an image transfer process, and a cleaning process are performed around the photosensitive drum 222 by the electrostatic charger 223, the optical writing device 227, the developing unit 224, the image transfer device 225, the static eliminator 229, and the cleaner 226, respectively. At the image forming position between the photosensitive drum 222 and the image transfer device 225, an unfixed developer image formed based on image data is transferred to a surface of the recording sheet. The recording sheet is then guided to the fixing unit 217 located downstream of the image forming position in the sheet feeding path. The fixing unit 217 applies heat and pressure to the unfixed developer image, thereby fixing the developer image onto the recording sheet.

The sheet feeding path is branched into two directions at a location downstream of the fixing unit 217, one being connected to the switch back path 221 for reversing the advancing direction of the recording sheet to form an image also on the reverse side of the recording sheet, the other being connected to the post processing unit 260 for performing post-processing such as stapling for the recording sheet on which an image has been formed and ejecting the recording sheet to an elevator tray 261. It is to be noted that although a monochromatic image forming apparatus is described in the embodiment, the advantages of the present invention can be obtained also in the case of a multicolor image forming apparatus.

In the embodiment, the digital image forming apparatus 1 has six photointerrupters 40A to 40F for detecting whether each of the following components of the apparatus 1 is ready to perform an image forming process. The photointerrupter 40A detects open/close state of the automatic document feeder 112. The photointerrupter 40B detects presence of recording sheet on the manual feed tray 254. The photointerrupter 40C detects presence of an original document on the document set tray in the automatic document feeder 112. The photointerrupters 40D, 40E, and 40F detect whether the paper cassettes 251, 252, and 253 are installed at respective predetermined positions. In the embodiment, the photointerrupters 40A to 40F correspond to the sensors of the invention.

Figure 2:
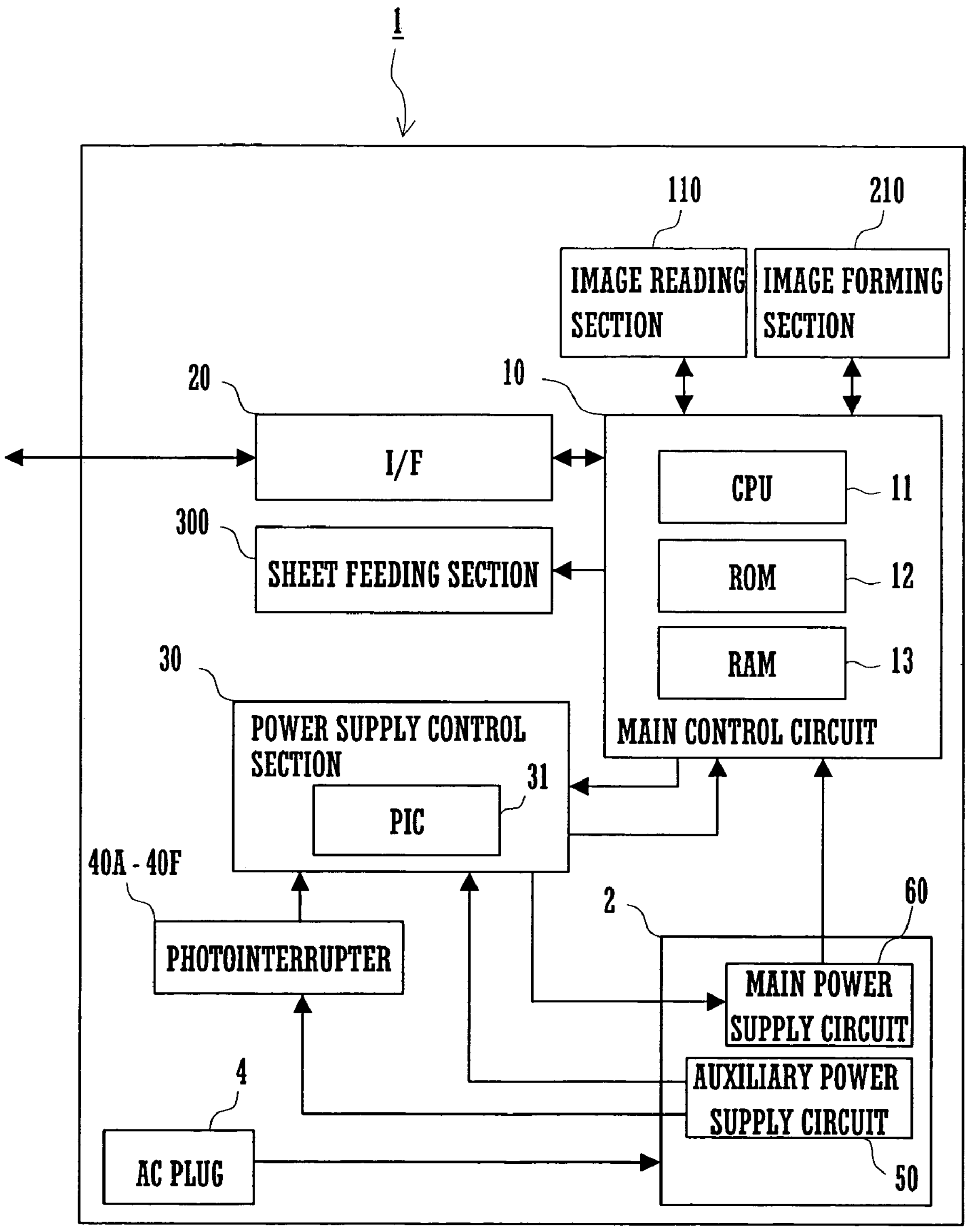
FIG. 2 is a block diagram schematically illustrating the construction of the apparatus.

FIG. 2 is a block diagram schematically illustrating the construction of the digital image forming apparatus 1. The digital image forming apparatus 1 includes a power supply section 2, a power supply control section 30, a main control circuit 10, an interface section 20, the image reading section 110, the image forming section 210, the photointerrupters 40A to 40F, and an AC plug 4.

The image reading section 110 reads an image on an original document at the image reading position on the platen 111. The image forming section 210 performs an image forming process in accordance with input image data. The interface section 20 is utilized for communication between the apparatus 1 and external devices.

The power supply control section 30 provided with a PIC 31 turns on/off a main power supply circuit 60 in the power supply section 2. A normal operation mode as referred in the embodiment is a mode in which the main power supply circuit 60 is on, and a power-saving operation mode is a mode in which the circuit 60 is off. A primary function of the circuit 60 is to switch the digital image forming apparatus 1 to either the normal or the power-saving operation mode depending on an operating state thereof.

The power supply section 2 includes the main power supply circuit 60 and an auxiliary power supply circuit 50. The auxiliary power supply circuit 50 supplies power to the power supply control section 30 in the power-saving operation mode in which the main power supply circuit 60 stops power supply. The main power supply circuit 60 supplies power to each of the components, including the main control circuit 10, of the digital image forming apparatus 1.

The main control circuit 10 including a CPU 11, a ROM 12, and a RAM 13 has overall control of the components of the digital image forming apparatus 1. The main control circuit 10 is connected to each of the power supply section 2, the power supply control section 30, the interface section 20, the image reading section 110, the image forming section 210, and the sheet feeding section 300.

The main control circuit 10 switches on/off the main power supply circuit 60 through the power supply control section 30. When turning off the main power supply circuit 60, the main control circuit 10 outputs a predetermined signal, i.e., a $\overline{PS}$ signal, to the power supply control section 30.

With no command received, and thus no job to perform, for more than a predetermined time period, the main control circuit 10 switches the main power supply circuit 60 to the power-saving operation mode to reduce standby power consumption. In the power-saving operation mode, the main power supply circuit 60 suspends operation until detection of user's operation for initiating an image forming process.

Figure 3:
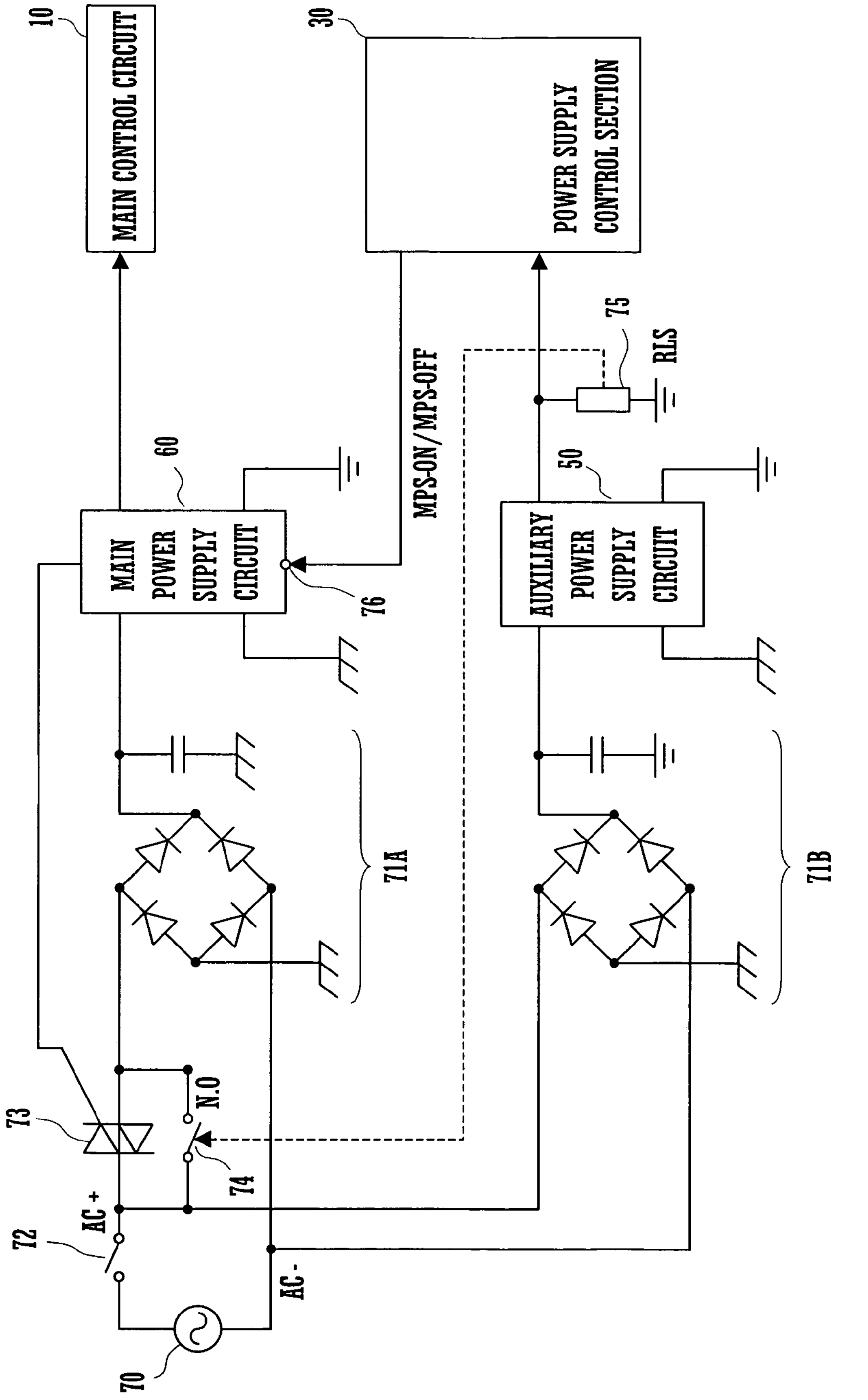
FIG. 3 is a block diagram illustrating a configuration of a power supply section provided in the apparatus.

Referring to FIG. 3, a commercial power supply 70 is connected to the auxiliary power supply circuit 50 through a main switch 72 and a smoothing circuit 71B. The main switch 72 is a switch for switching on/off a main power supply of the digital image forming apparatus 1. The smoothing circuit 71B provided for rectification and smoothing has a diode bridge and a capacitor. The auxiliary power supply circuit 50 is connected to a grounded relay coil 75 and the main power supply control section 30, respectively. The commercial power supply 70 is also connected to the main power supply circuit 60 through the main switch 72, a triac 73, a relay contact 74, and a smoothing circuit 71A. The triac 73 has a gate connected to the main power supply circuit 60. The relay contact 74 is a normally open relay contact that is switched open/closed by the relay coil 75. The triac 73 and the relay contact 74, which are connected in parallel, are both connected to the main switch 72 and to the smoothing circuit 71A. The smoothing circuit 71A is identical in design to the smoothing circuit 71B.

The main power supply circuit 60 is provided with an MPS signal input terminal 76. To the MPS signal input terminal 76, a low-level signal to switch on the main power supply circuit 60, i.e., an MPS-ON signal, and a signal to switch off the main power supply circuit 60, i.e., an MPS-OFF signal, are input selectively. The main power supply circuit 60 is connected to the gate of the triac 73 and to the main control circuit 10.

Described below is how the digital image forming apparatus 1 operates. The digital image forming apparatus 1 is activated by turning on the main switch 72. In the activation process, current flows from the commercial power supply 70 to the auxiliary power supply circuit 50 through the smoothing circuit 71B. Then, the auxiliary power supply circuit 50 supplies power to the relay coil 75. Current flowing through the relay coil 75 causes the relay contact 74 to be closed, thereby allowing current flow from the commercial power supply 70 to the main power supply circuit 60 through the relay contact 74 and the smoothing circuit 71A.

Subsequently, the main power supply circuit 60 initiates power supply to the gate of the triac 73, thereby allowing the triac 73 to become conductive. The main power supply circuit 60 also initiates power supply to the main control circuit 10, thereby allowing the digital image forming apparatus 1 to initiate operations.

Figure 4:
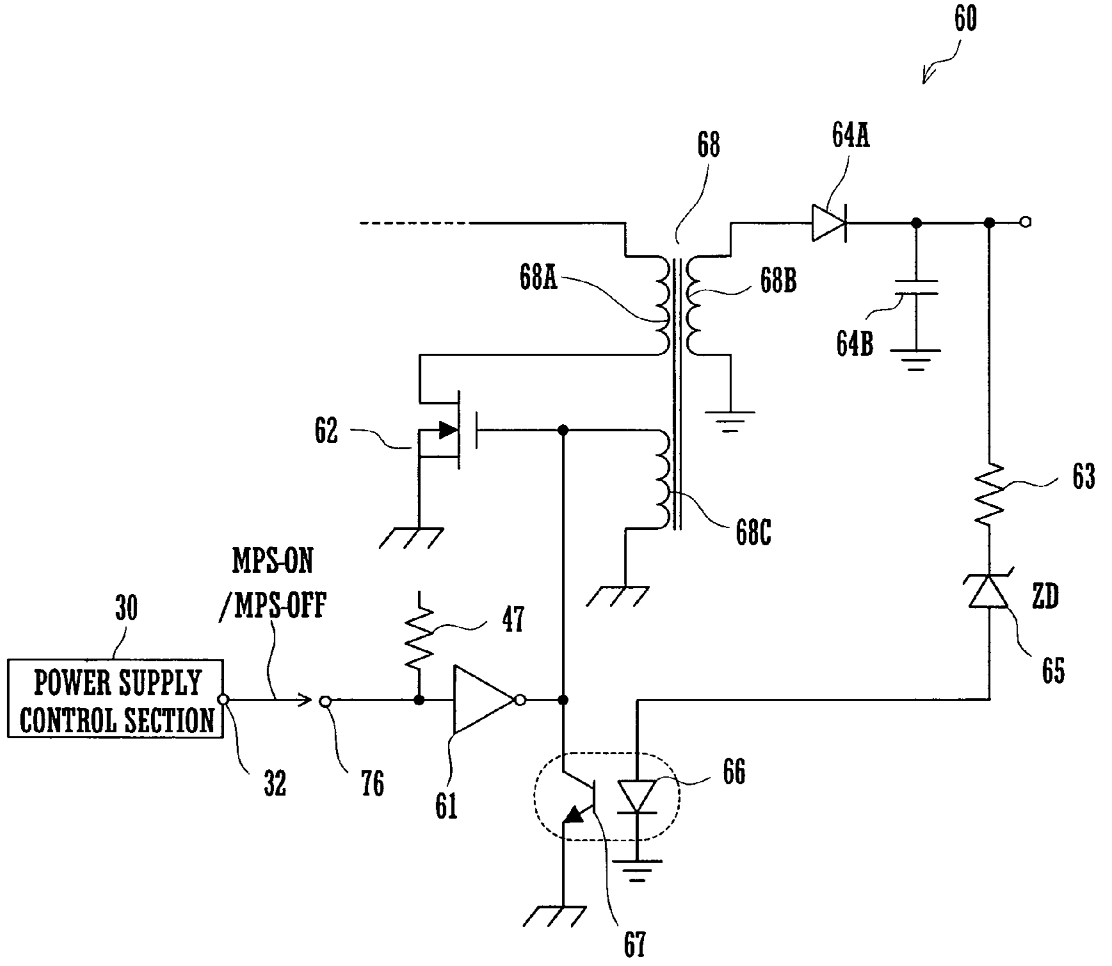
FIG. 4 is a block diagram illustrating a configuration of a main power supply circuit in the power supply section.

Referring to FIG. 4, the main power supply circuit 60 is provided with a switching transformer 68 having a first primary winding 68A, a second primary winding 68C, and a secondary winding 68B. The first primary winding 68A is connected to the smoothing circuit 71A and a switching transistor 62. The secondary winding 68B is connected to an anode of a diode 64A, and a cathode of the diode 64A is connected to a grounded capacitor 64B and a power supply terminal.

A connection midway between the capacitor 64B and the power supply terminal is grounded through a resistor 63, a zener diode 65, and a light-emitting diode 66.

The switching transistor 62 has a gate connected to the second primary winding 68C and to a phototransistor 67 with a grounded emitter. The phototransistor 67 has a collector connected to the MPS signal input terminal 76 through an open-collector inverter 61. A connection midway between the MPS signal input terminal 76 and the inverter 61 is connected to the auxiliary power supply circuit 50 through a pull-up resistor 47.

When an MPS-ON signal is input to the MPS signal input terminal 76, output of the inverter 61 is put in a high-impedance state, so that the gate of the switching transistor 62 becomes ungrounded. A valid feedback signal is thus input to the gate of the switching transistor 62 from the first primary winding 68A, thereby causing switching oscillation. The switching oscillation allows power supply from the secondary winding 68B to the main control circuit 10 through the power supply terminal.

When electric potential at the connection midway between the capacitor 64B and the power supply terminal reaches a predetermined value, current flows to the light-emitting diode 66 through the resistor 63 and the zener diode 65. Consequently, the phototransistor 67 is turned on and the gate of the switching transistor 62 is forced to be grounded, so that the switching oscillation of the switching transformer 68 is stopped. The switching on/off of switching oscillation allows sufficient power to be supplied from the main power supply circuit 60 to the main control circuit 10.

When an MPS-OFF signal is input to the MPS signal input terminal 76, in contrast, the gate of the switching transistor 62 is forced to be grounded. Switching oscillation of the switching transformer is thus stopped.

For example, when an MPS-OFF signal is input from the main power supply control section 30 to the MPS signal input terminal 76 in the normal operation mode, switching oscillation of the switching transformer is stopped. When an MPS-ON signal is input from the main power supply control section 30 to the MPS signal input terminal 76 in the power-saving operation mode, switching oscillation of the switching transformer is initiated.

The power supply control section 30 outputs either an MPS-ON signal or an MPS-OFF signal to the MPS signal input terminal 76, according to the operation mode of the digital image forming apparatus 1. With no command input to the digital image forming apparatus 1 for more than a predetermined time, the main control circuit 10 outputs a power-save request signal to the power supply control section 30. Upon receipt of the valid power-save request signal, the power supply control section 30 outputs an MPS-OFF signal to the MPS signal input terminal 76.

Figure 5:
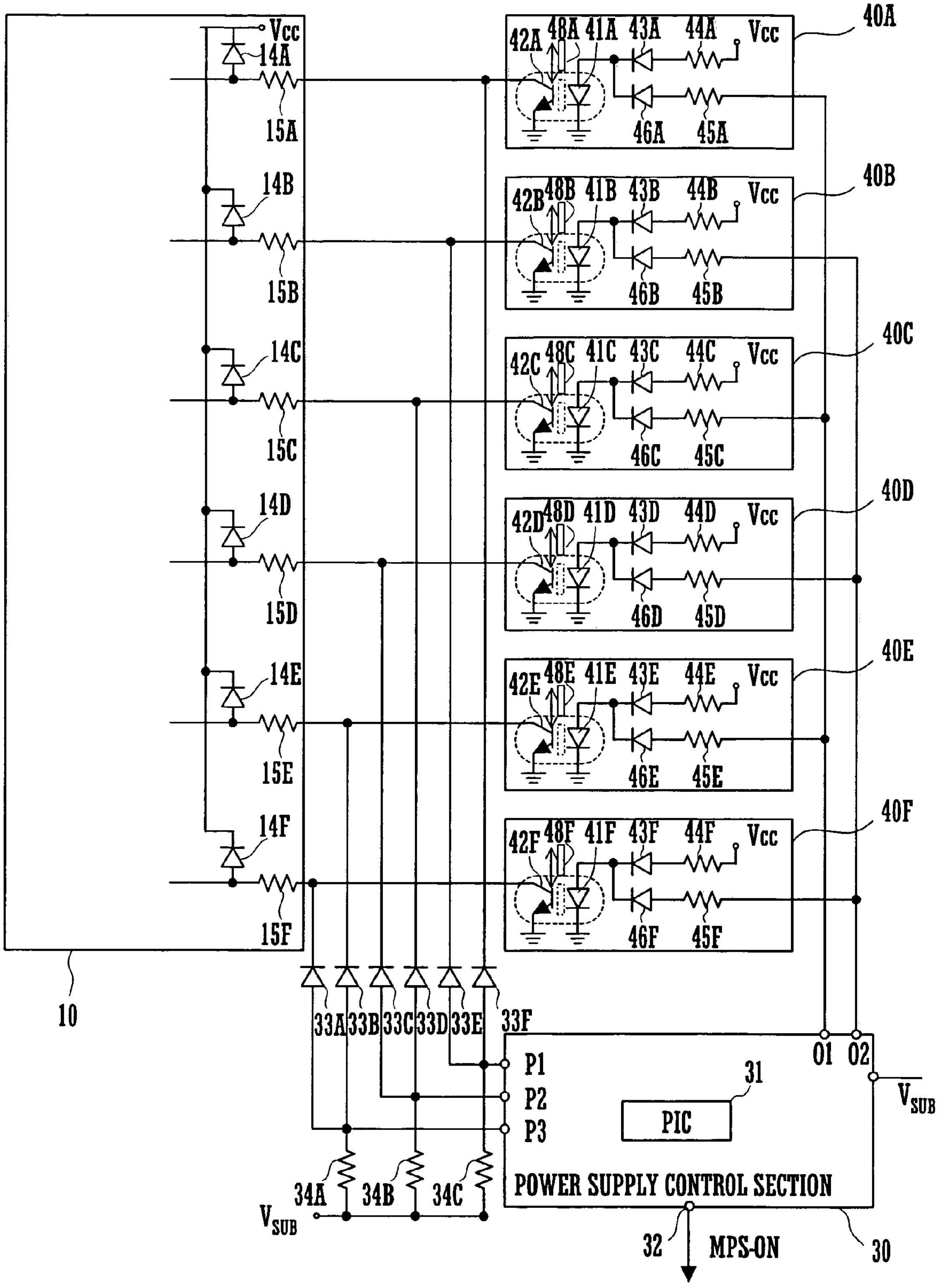
FIG. 5 is a block diagram illustrating a manner in which a power supply control section, photointerrupters, and a main control circuit are connected to one another.

FIG. 5 is a block diagram illustrating a manner in which the power supply control section 30, the photointerrupters 40A to 40F, and the main control circuit 10 are connected to one another.

The photointerrupters 40A to 40F are divided into two groups, with the photointerrupters 40A, 40C, and 40E into a first group and the photointerrupters 40B, 40D, and 40F into a second group. The photointerrupters 40A, 40C, and 40E of the first group are connected to the auxiliary power supply circuit 50 through a terminal O1. The photointerrupters 40B, 40D, and 40F of the second group are connected to the circuit 50 through a terminal O2.

It is to be noted that the photointerrupters 40A to 40F may be divided into three or more groups, instead of the two groups as described above.

he photointerrupter 40A has resistors 44A and 45A, diodes 43A and 46A, a light-emitting diode 41A, and a phototransistor 42A. The resistor 45A has a first end connected to the terminal O1, and a second end grounded through the diode 46A and the light-emitting diode 41A. A connection midway between the diode 46A and the light-emitting diode 41A is connected to the power supply terminal of the main power supply circuit 60 through the diode 43A and the resistor 44A. The phototransistor 42A has an emitter grounded, and a collector connected to the main control circuit 10 and to a signal input terminal P1 through a diode 33F.

he photointerrupter 40B has resistors 44B and 45B, diodes 43B and 46B, a light-emitting diode 41B, and a phototransistor 42B. The resistor 45B has a first end connected to the terminal O2, and a second end grounded through the diode 46B and the light-emitting diode 41B. A connection midway between the diode 46B and the light-emitting diode 41B is connected to the power supply terminal of the main power supply circuit 60 through the diode 43B and the resistor 44B. The phototransistor 42B has an emitter grounded, and a collector connected to the main control circuit 10. Also, the collector of the phototransistor 42B is wired-OR connected through a diode 33E to a connection midway between the signal input terminal P1 and the diode 33F. This connection is connected to the auxiliary power supply circuit 50 through a pull-up resistor 34C. Thus, with the phototransistors 42A and 42B both in OFF state, a high-level signal is input to the terminal P1. With either one of the phototransistors 42A and 42B in ON state, a low-level signal is input to the terminal P1.

Likewise, respective collectors of the phototransistors 42C and 42D are in wired-OR connection, and respective collectors of the phototransistors 42E and 42F are in wired-OR connection. Consequently, the phototransistors 42C and 42D are connected to a signal input terminal P2, and the phototransistors 42E and 42F are connected to a signal input terminal P3.

In the embodiment, the light-emitting diodes 41A to 41F correspond to light-emitting elements of the invention, and the phototransistors 42A to 42F correspond to light-sensitive elements of the same. Between the light-emitting diode 41A and the phototransistor 42A, there is disposed a light-blocking member 48A for blocking or allowing passage of light from the light-emitting diode 41A. The light-blocking member 48A is displaced according to the user's preparatory operation to the digital image forming apparatus 1. The light-blocking member 48A as displaced allows or blocks the passage of light from the light-emitting diode 41A, thereby causing the phototransistor 42A to receive or not receive the light.

The phototransistor 42A is connected to an input of the main control circuit 10 through a resistor 15A. The resistor 15A is connected to an anode of a diode 14A. The diode 14A has a cathode connected to the main power supply circuit 60. The input of the main control circuit 10 is thus connected to the main power supply circuit 60 through the diode 14A. Herein, the resistor 15A and the diode 14A form an anti-latchup circuit.

In the normal operation mode, the main power supply circuit 60 supplies power to each of the light-emitting diodes 41A to 41F, so that the main control circuit 10 detects respective output levels of the phototransistors 42A to 42F.

In the power-saving operation mode, the power supply control section 30 detects whether or not the phototransistors 42A to 42F receive lights from the light-emitting diodes 41A to 41F, respectively. In the power saving operation mode, the power supply control section 30 renders either one of the terminals O1 and O2 conductive and the other into a high impedance state. It is to be noted that if there is an increased number of terminals corresponding to an increased number of groups of the photointerrupters 40A to 40F, either one of the terminals are rendered conductive with the others in high impedance states.

The main control circuit 10 detects respective output levels of the phototransistors 42A, 42C, and 42E by detecting signals input to the signal input terminals P1, P2, and P3 as when the terminal O1 is rendered conductive. The circuit 10 also detects respective output levels of the phototransistors 42B, 42D, and 42F by detecting signals input to the terminals P1, P2, and P3 as when the terminal O2 is rendered conductive.

In shifting the apparatus 1 from the normal operation mode to the power-saving operation mode, the main control circuit 10 provides data on the respective output levels of the phototransistors 42A to 42F with the power supply control section 30. The data as provided is stored in the PIC 31. The PIC 31 detects signals as input sequentially to the terminals P1, P2, and P3, thereby determining whether there occurs a change in output level of each of the phototransistors 42A to 42F with reference to the data as stored. Let us suppose a case in which a user opens the automatic document feeder 112, places an original document on the platen 111, sets a recording sheet in the manual feed tray 254, or inserts or removes the paper cassettes 251 to 253, in the power-saving operation mode. These operations cause either one of the light-blocking members 48A to 48F to be displaced, resulting in a change in output level of either one of the phototransistors 42A to 42F.

When the PIC 31 detects the change in output level, the power supply control section 30 outputs an MPS-ON signal to the MPS signal input terminal 76 of the main power supply circuit 60.

As thus described, the configuration illustrated in FIG. 5 allows the photointerrupters 40A to 40F and the PIC 31 to be activated with a small amount of power, as well as allowing the return from the power-saving operation mode to be triggered by the change in output level of either one of the phototransistors 42A to 42F.

Figure 6:
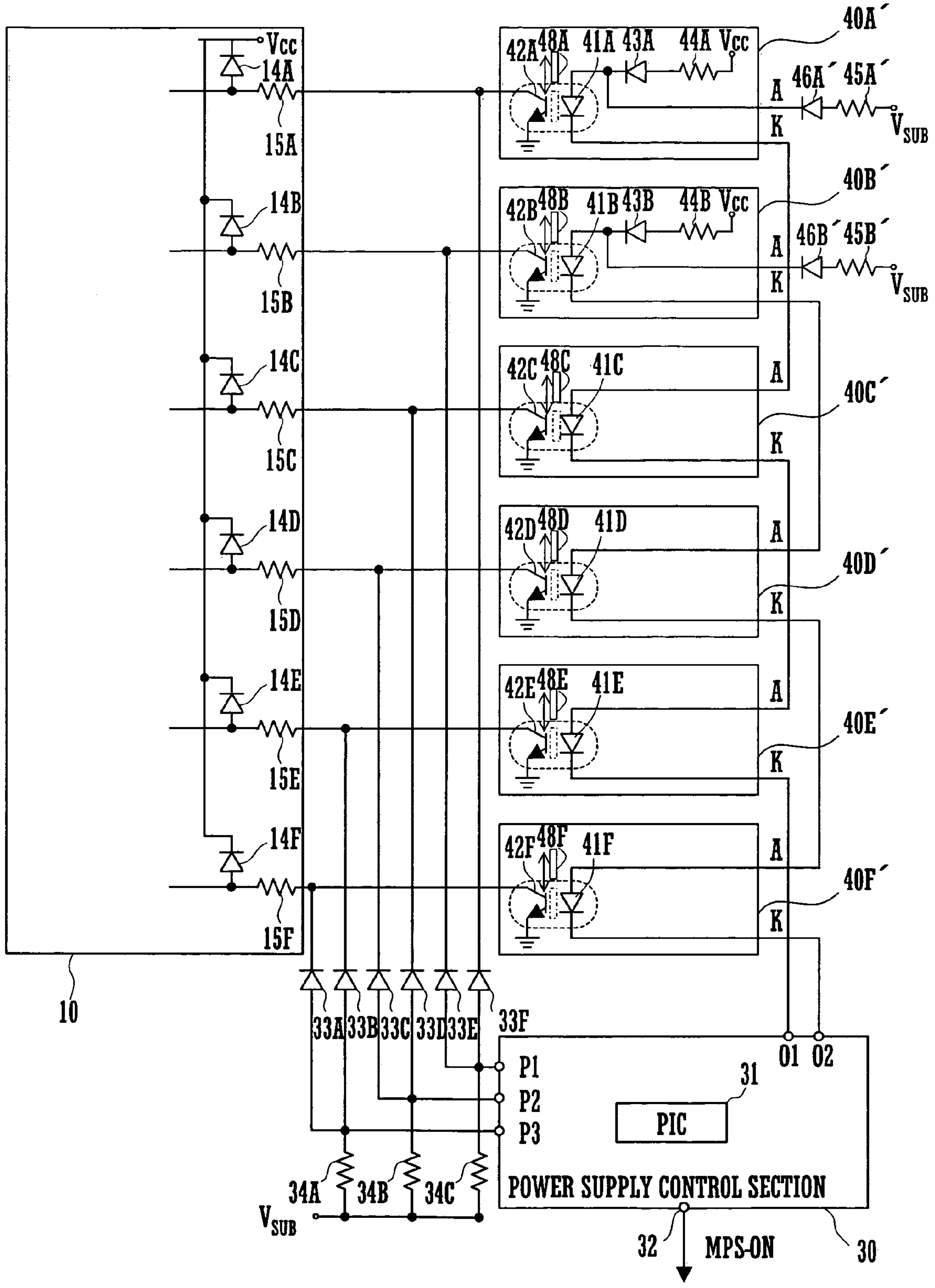
FIG. 6 is a block diagram illustrating another manner in which the power supply control section, photointerrupters, and the main control circuit are connected to one another.

FIG. 6 is a block diagram illustrating another manner in which the power supply control section 30, photointerrupters 40A' to 40F', and the main control circuit 10 are connected to one another. The photointerrupters 40A' to 40F' are basically similar in configuration to the photointerrupters 40A to 40F in FIG. 5. The photointerrupters 40A' to 40F' are different from the photointerrupters 40A to 40F in that the photointerrupters 40A', 40C', and 40E' of a first group are serial-connected and in that the photointerrupters 40B', 40D', and 40F' of a second group are serial-connected.

The photointerrupter 40A' has the light-emitting diode 41A, the phototransistor 42A, diodes 43A and 46A', and resistors 44A and 45A'. Likewise, the photointerrupter 40B' has the light-emitting diode 41B, the phototransistor 42B, diodes 43B and 46B', and resistors 44B and 45B'.

The photointerrupter 40C has the light-emitting diode 41C and the phototransistor 42C. The photointerrupter 40D has the light-emitting diode 41D and the phototransistor 42D. The photointerrupter 40E has the light-emitting diode 41E and the phototransistor 42E. The photointerrupter 40F has the light-emitting diode 41F and the phototransistor 42F.

In the photointerrupter 40A, the light-emitting diode 41A has an anode connected to the auxiliary power supply circuit 50 through the diode 46A' and the resistor 45A'. A connection midway between the light-emitting diode 41A and the diode 46A' is connected to the main power supply circuit 60 through the diode 43A and the resistor 44A. The light-emitting diode 41A has a cathode connected to an anode of the light-emitting diode 41C of the photointerrupter 40C'. A cathode of the light-emitting diode 41C is connected to an anode of the light-emitting diode 41E of the photointerrupter 40E'. A cathode of the light-emitting diode 41E is connected to the terminal O1. Likewise, the light-emitting diode 41B of the photointerrupter 40B' is connected to the terminal O2 through the light-emitting diode 41D of the photointerrupter 40D' and the light emitting diode 41F of the photointerrupter 40F'.

The configuration as illustrated in FIG. 6 has a decreased number of required elements, compared with the number of elements that the configuration in FIG. 5 has. Also, the configuration in FIG. 6 requires a smaller amount of power for detecting the output levels of the phototransistors 42A to 42F because the light-emitting diodes 41A, 41C, and 41E of the first group are serial-connected and the light-emiting diodes 41B, 41D, and 41F of the second group are serial-connected.

The embodiment as described above allows reduced power consumption because of the intermittent activation of the light-emitting diodes 41A to 41F in the power-saving operation mode. In the normal operation mode, on the other hand, the constant supply of power to the light-emitting diodes 41A to 41F allows the main control circuit 10 constantly to monitor the output levels of the phototransistors 42A to 42F. This results in prompt detection of a user's preparatory operation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image forming apparatus, comprising:

a main power supply section as a power source operative in a normal operation mode;

an auxiliary power supply section as a power source operative in a power-saving operation mode where the apparatus stands by with reduced power consumption;

a plurality of sensors each changing output level thereof upon detection of a user's preparatory operation for an image forming process; and a power supply control section for switching the apparatus from the normal operation mode to the power-saving operation mode after a predetermined time period during which no image forming process is performed, the power supply control section switching the apparatus back to the normal operation mode upon detection of a change in output level of either one of the plurality of sensors in the power-saving operation mode, wherein the plurality of sensors are connected to the auxiliary power supply section through the power supply control section; and wherein the power supply control section connects part of the plurality of sensors sequentially to the auxiliary power supply section in such a manner that the plurality of sensors are intermittently activated by the auxiliary power supply section in the power-saving operation mode.

2. An image forming apparatus according to claim 1, wherein the main power supply section is connected to each of the plurality of sensors in such a manner that all of the plurality of sensors are constantly activated by the main power suply section, thereby allowing respective output levels of the plurality of sensors to be detected simultaneously in the normal operation mode.

3. An image forming apparatus according to claim 1, wherein the plurality of sensors each include:

a light-emitting element for emitting light;

a light-sensitive element for receiving the light; and a light-blocking member configured to move to allow or block passage of the light, wherein the light-blocking member is moved by a force generated by the user's preparatory operation.

4. An image forming apparatus according to claim 3, wherein the light-emitting elements are connected in series to the auxiliary power supply section.

5. The image forming apparatus according to claim 4, wherein the light-sensitive elements each include a phototransistor having a grounded emitter and an open collector; and wherein the phototransistors are divided into two or more groups, and the collectors of the phototransistors of the different groups are wired-OR connected to a common line which is connected to a pull-up resistor.

* * * * *